Aug. 28, 1962 A. E. KOSH 3,050,860
LENS MEASURING INSTRUMENT
Filed June 9, 1959

INVENTOR.
ALLAN E. KOSH
BY Julius L. Rubinstein
ATTORNEY

United States Patent Office 3,050,860
Patented Aug. 28, 1962

3,050,860
LENS MEASURING INSTRUMENT
Allan E. Kosh, 74 Donnybrook Road, Scarsdale, N.Y.
Filed June 9, 1959, Ser. No. 819,182
1 Claim. (Cl. 33—174)

The present invention relates to a lens measuring instrument, and more particularly to an instrument for measuring the vertical and horizontal dimensions of a rectangle circumscribing a lens.

Spectacle lenses come in a variety of shapes and sizes, and for purposes of conveniently fitting the lenses a boxing method of specifying eye size has been adopted by various optical manufacturers. By this method which is more particularly described in the Journal of the American Optometric Association, February 1959, the eye size is designated in terms of the vertical and horizontal dimensions of a rectangle circumscribing the lens. The geometric center of the lens coincides with the rectangle's geometric center through which passes the 0–180 meridian of the lens parallel to the horizontal dimension of the rectangle. When a lens is ordered for a patient, the location of the segments and major reference points may be described in relation to the geometric center of the lens and its 0–180 meridian. In such a case, it is important to be able conveniently and accurately to box the uncut or unfinished lens before finishing so as to select a properly sized lens and locate the segments and other major reference points. Due to the irregular shapes of lenses currently in favor, the use of a straight edge or other simple measuring devices requires that the technician making the measurements estimate the extremities of the lenses enclosed by the circumscribing rectangle; and as would be expected from such an arrangement, the measurements taken are frequently inaccurate, and vary considerably for the same lens whose measurements may be taken at different times by different persons. Mechanical devices which have heretofore been developed for making more accurate measurements are usually quite involved, relatively expensive, and somewhat difficult to use for measuring a relatively large number of lenses.

This invention avoids many of the disadvantages of prior ways of taking these measurements. The device herein described is simple in construction and thereby relatively inexpensive. It is compact, convenient to use, and furthermore, it is capable of making the aforementioned measurements with uniform good accuracy.

It is therefore a first object of this invention to provide a compact instrument for taking the dimensions along minor and major perpendicular axes comprising the boxing rectangle for a spectacle lens.

It is a further object of this invention to provide apparatus for measuring accurately and uniformly, the physical dimensions along predetermined vertically arranged axes of an object having an overall co-planar configuration.

It is still another object of this invention to provide a novel and simple device to take certain measurements of a lens.

Other objects and advantages of this invention will hereinafter more clearly appear from the following detailed description of a preferred embodiment made with reference to the accompanying drawing in which.

Figure 1:
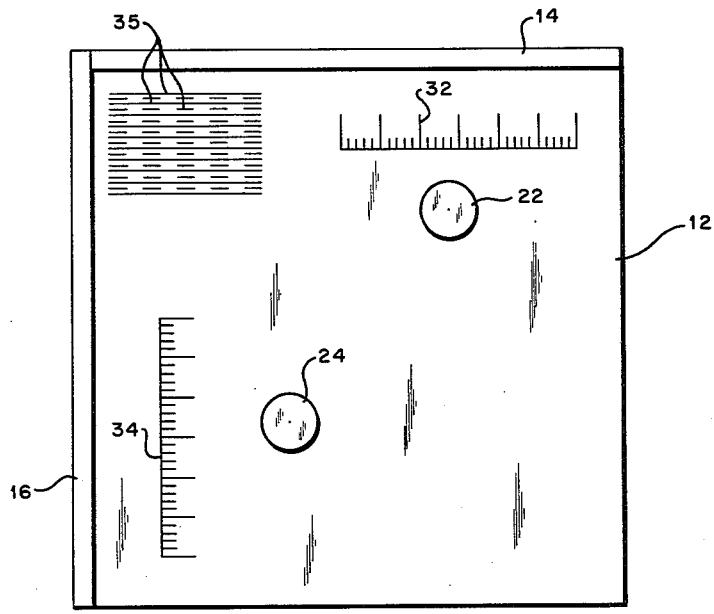
FIGURE 1 is a plan view of the base plate upon which the measurements are taken.
Figure 2:
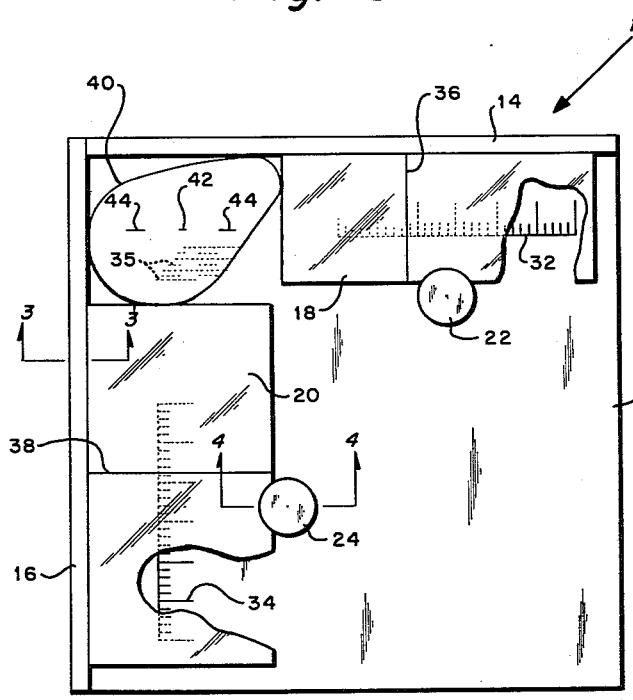
FIGURE 2 is an assembled view of the preferred embodiment of this invention with a lens undergoing measurement.
Figure 3:
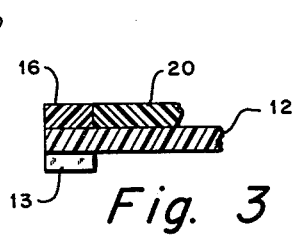
FIGURE 3 is a view along 3—3 of FIGURE 2.

Referring to the drawing, device 10 consists of a flat, horizontally disposed plate 12, which may have a square or other convenient configuration as illustrated. Plate 12 would be conveniently supported by corner legs or posts 13, and is provided along two adjacent edges with shoulders 14 and 16 for a purpose to be later described. Plate 12 is also provided with a pair of guide posts 22 and 24, etchings or markings comprising linear scales 32 and 34, and a plurality of parallel lines 35, which may be alternating solid and broken lines for minimizing errors due to misalignment of a lens undergoing measurement.

Figure 4:
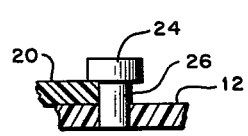
FIGURE 4 is a view along 4—4 of FIGURE 2.

A pair of transparent, slides 18 and 20 are mounted on plate 12 in the positions illustrated. As seen in connection with slide 20, the latter is placed on plate 12 with one edge against shoulder 16 and the opposite edge thereof adjacent to guide post 24 which is seen to be supported by a smaller diameter pin 26 embedded in plate 12 as best shown in FIGURE 4. In this manner both slides 18 and 20 are held snugly in position except when pushed along each respective major axis. Slides 18 and 20 are each provided with a hair line 36 and 38, respectively, which as will be seen below, are utilized to read linear scales 32 and 34 marked on plate 12 and observed through transparent slides 18 and 20. Scales 32 and 34 may consist of millimeter gradations marked (but not shown) in convenient fashion or in any other scale suitable for the purpose intended.

In the use of device 10, a spectacle lens 40 which may have a highly irregular shape is placed on plate 12 in the corner enclosed by shoulders 14 and 16. Lens 40 is, or may be provided with, markings indicating the geometric center 42 as previously defined and a pair of points 44 on the 0–180 meridian of the lens. Points 44 may be provided by the manufacturer of the lens or added in a manner understood in the art by the finisher of the lens prior to inserting it in device 10 for boxing. The vertical dimension would be in a line perpendicular to the 0–180 meridian as is understood. Lens 40 is properly aligned by rotating it until points 44 fall on one line among those generally indicated as 35, while holding lens 40 snug against both shoulders 14 and 16. Slides 18 and 20 are then both moved in directions toward lens 40 until they abut against the edge of lens 40. Scales 32 and 34 are then read by the observer at the points intersected by hair lines 36 and 38. It is understood, therefore, that scales 18 and 20 are both accurately shaped with right angled corners and smooth, straight sided edges, and the hair lines are properly located thereon to give the proper readings on scales 32 and 34 as to the boxing dimensions of lens 40.

It is thus seen that there has been provided a simply constructed device for accurately and efficiently making appropriate measurements of spectacle and similar lenses in accordance with the boxing method of specifying eye size, which heretofore required more elaborate equipment to accomplish the same result with adequate accuracy.

While there has been shown and described a particular embodiment of this invention, it will be obvious to those skilled in the art that various changes and modifications may be made without departing from this invention in its broader aspects, and it is, therefore, aimed in the appended claim to cover all such changes and modifications as fall within the true spirit and scope of this invention.

What is therefore claimed as my invention is:

For use in measuring the box dimensions of an irregularly shaped lens having markings thereon to denote a meridian, an instrument, comprising: a base plate; first and second shoulders carried by said plate, said shoulders being in perpendicular relationship to one another and forming a right angle corner against which the lens may be abutted for measurement thereof; first and second elongated, flat, transparent slides carried by said plate, each of said slides having a first side edge in contact with a respective one of said shoulders and being movable along its respective shoulder towards and away from said corner along a path parallel to said shoulder, each slide being provided with an end edge facing said corner for contacting the lens, each end edge being normal to the path of movement of its respective slide; first and second means in contact with a second side edge of said first and second slides, respectively, for movably holding each first side edge in contact with its respective shoulder; a group of thin, closely spaced, lines carried on said plate adjacent said corner for orienting the lens with respect to said shoulders, said lines being aligned parallel to one of said shoulders, said plate being provided with a scale for and beneath each of said slides, each slide being provided with a hairline extending over one of said scales, each scale being calibrated to read under said hairline the box dimension of the lens between the end edge of said slide and the oppositely facing shoulder when the meridian of the lens is aligned parallel to said lines.

References Cited in the file of this patent

UNITED STATES PATENTS

| | | |
|---|---|---|
| 89,919 | Cross | May 11, 1869 |
| 1,292,121 | Stead | Jan. 21, 1919 |
| 1,336,040 | Mathewson | Apr. 6, 1920 |
| 2,018,630 | Bliss | Oct. 22, 1935 |
| 2,088,914 | Long | Aug. 3, 1937 |
| 2,535,633 | Hobbs | Dec. 26, 1950 |
| 2,600,809 | Simmons | June 17, 1952 |
| 2,688,878 | Kolisch | Sept. 14, 1954 |
| 2,848,923 | Diefenbach | Aug. 26, 1958 |

FOREIGN PATENTS

| | | |
|---|---|---|
| 233,331 | Switzerland | Sept. 15, 1942 |